(12) United States Patent
Schmitt et al.

(10) Patent No.: US 6,279,626 B1
(45) Date of Patent: Aug. 28, 2001

(54) CLOSURE CAP FOR A TANK

(75) Inventors: Manfred Schmitt, Heppenheim; Ulrich Kappenstein, Knittlingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,526

(22) PCT Filed: Oct. 29, 1998

(86) PCT No.: PCT/DE98/03158

§ 371 Date: Sep. 18, 2000

§ 102(e) Date: Sep. 18, 2000

(87) PCT Pub. No.: WO99/22956

PCT Pub. Date: May 14, 1999

(30) Foreign Application Priority Data

Oct. 30, 1997 (DE) ............................................. 197 47 986

(51) Int. Cl.⁷ ................................ B65B 1/04; B65B 3/00; B67C 3/00
(52) U.S. Cl. ........................... 141/348; 141/285; 141/301; 220/86.2
(58) Field of Search .................................... 141/312, 348, 141/285, 301, 302, 59; 220/86.2; 280/834; 296/97.22

(56) References Cited

U.S. PATENT DOCUMENTS

| 3,133,741 | 5/1964 | Garabello . | |
|---|---|---|---|
| 5,145,081 | * 9/1992 | Gravino | 220/86.2 |
| 5,485,871 | 1/1996 | Romanek et al. . | |
| 5,568,828 | * 10/1996 | Harris | 141/348 |
| 5,988,238 | * 11/1999 | Palvolgyi | 141/312 |

FOREIGN PATENT DOCUMENTS

| 34 25 461 | 1/1986 | (DE) . |
| 41 09 337 | 10/1991 | (DE) . |
| 197 46 236 | 5/1998 | (DE) . |
| 2 529 532 | 1/1998 | (FR) . |

* cited by examiner

Primary Examiner—Timothy L. Maust
(74) Attorney, Agent, or Firm—Kenyon & Kenyon

(57) ABSTRACT

A closure for a tank, in particular a fuel tank for a motor vehicle or the like, that has a tank filling pipe which can be closed with a closure flap, is described. The closure flap has a locking device with which it can be locked and unlocked and is also connected by a hinge or the like, so that it can move into the interior of the tank filling pipe. The locking device is located completely beneath the closure flap so that the closure flap can be locked and unlocked. Thus the locking device is not accessible from the outside, so it cannot be damaged or operated by an unauthorized party. The tank filling pipe can also be sealed airtight by the closure flap or by a closure valve arranged in the tank filling pipe.

25 Claims, 3 Drawing Sheets

CLOSURE CAP FOR A TANK

FIELD OF THE INVENTION

The present invention relates to a closure for a tank, in particular a fuel tank for a motor vehicle

BACKGROUND INFORMATION

A conventional closure is described in U.S. Pat. No. 5,485,871, according to which a tank filling pipe is provided with an airtight shut-off valve. The valve cover can be unlocked by operating a button, so that it can be moved by the filling nozzle to the inside of the tank filling pipe.

This is problematical due to the fact that the closure mechanism can easily be damaged by improper handling or an accident because it projects out of the tank filling pipe. This is a disadvantage on motor vehicles in particular when this mechanism projects out of the body of the vehicle.

Moreover, the device described in U.S. Pat. No. 5,485,871 is technically complicated and therefore expensive and susceptible to malfunction.

SUMMARY OF THE INVENTION

The closure according to the present invention, whose closure flap has an internal locking mechanism by which the closure flap can be locked and unlocked by the user, has the advantage that it offers a technically simple option for a closure whose locking device is not accessible from the outside. Therefore, the closure according to the present invention cannot be opened by an unauthorized third party.

A locking device that ensures automatic locking of the closure is especially advantageous. Operational reliability is increased by automatic locking after the tank filling operation. In addition, this prevents the closure from inadvertently being left open when the vehicle is driven away. The closure according to the present invention is also very suitable for automatic filling of the tank by an automatic fueling system and for pressurized fueling to accelerate the process.

In particular, it is also advantageous if the locking device has a control device by means of which it can be linked to other operating conditions. For example, this makes it possible for the locking device to be released only after the engine of the vehicle is turned off, so that the tank closure cannot be unlocked while the engine is running.

An operating mechanism which detects an approaching filling nozzle, for example, and activates an opening mechanism for the closure cap, e.g., a spring/lever mechanism, by way of a controller increases operating convenience in an advantageous manner because the closure does not need to be opened or touched manually.

According to another advantageous embodiment, a closure valve, having at least one filling opening for fuel or the like, is provided in the tank filling pipe for airtight closure. In another advantageous embodiment, this closure valve is provided with a restoring spring, so that it can be pushed out of the valve seat by the filling nozzle, so the filling opening to the tank is opened. This embodiment also permits a refinement according to the present invention for pressurized tank filling where a separate filling opening and a separate vent opening are provided in the closure valve, so that air and vapors can be vented through a suction channel on the filling nozzle. It is advantageous that a locking device and/or at least one additional gasket are provided in the tank filling pipe. This guarantees a secure hold of the filling nozzle, so that a pressure can be built up.

DETAILED DESCRIPTION

Figure 1:
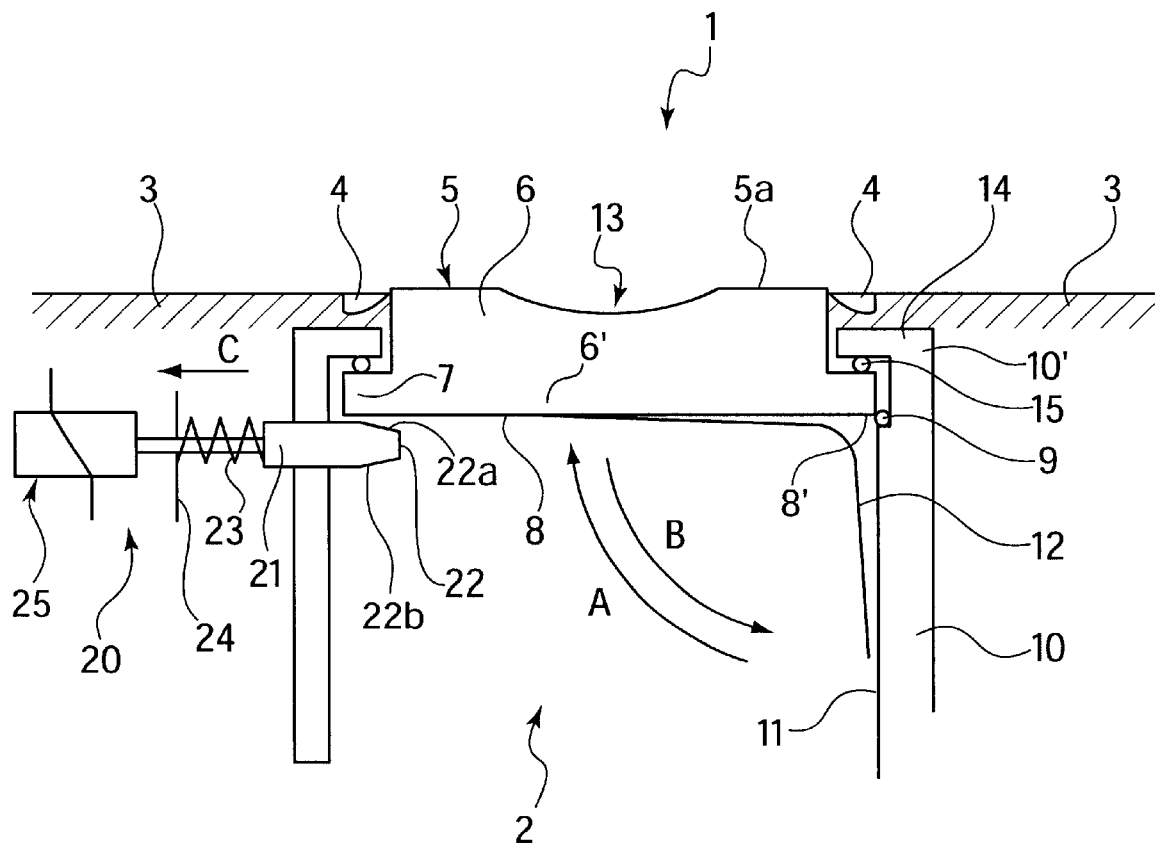
FIG. 1 shows a schematic diagram of a longitudinal section of a first embodiment of a tank closure according to the present invention.

FIG. 1 shows a first embodiment of a closure 1 for a fuel tank in a motor vehicle. Closure 1 has a closure flap 5 that provides an airtight closing of tank filling pipe 2 of the fuel tank. Closure flap 5 ends flush with vehicle body 3, indicated only schematically in FIG. 1, by a sealing lip 4.

Closure flap 5 is, for example round. It has an area 6 with an essentially rectangular cross section with a peripheral rim 7 on its lower part 6'. At a point 8' on lower edge 8 of rim 7, closure flap 5 is connected by a valve hinge 9 to inside 11 of longitudinal wall 10 of tank filling pipe 2. A restoring spring 12, for example a plate spring in this embodiment, presses closure flap 5 in the direction of arrow A into the closed position shown in FIG. 1. Closure flap 5 can be pressed inward into the interior of tank filling pipe 2 along arrow B against the restoring force of restoring spring 12. To this end, a recess 13 is provided on surface 5a facing outward on closure flap 5. For example, the tip of a filling nozzle can be placed on this recess 13, and with its help closure flap 5 can be pressed inward into tank filling pipe 2 along arrow B.

A peripheral strip 14 is provided at upper end 10' of wall 10 of tank filling pipe 2 in the vicinity of closure flap 5. Strip 14 extends over rim 7 in the closed position of closure flap 5 illustrated in FIG. 1. A gasket 15 ensuring an airtight closure of tank filling pipe 2 is provided between rim 7 of closure flap 5 and strip 14.

To secure closure flap 5 against unauthorized opening, a valve lock 20 is provided beneath closure flap 5 next to tank filling pipe 2. This valve lock 20 is located beneath vehicle body 3 and is thus inaccessible from the outside. It has essentially a locking pin 21 which projects through an opening in wall 10 of tank filling pipe 2. On its free end 22 projecting into tank filling pipe 2, locking pin 21 has a top sliding surface 22a and a bottom sliding surface 22b. In the locking position illustrated in FIG. 1, locking pin 21 is thus arranged beneath rim 7 of closure flap 5. When locked, closure flap 5 thus cannot be pressed in the direction of arrow B.

Locking pin 21 is connected to a drive mechanism 25, for example in the form of a small lifting magnet or electric motor. Locking pin 21 is also provided with a spring 23 which is in contact with a stop strip 24 and thus forces locking pin 21 into the locking position illustrated in FIG. 1. The locking pin can be retracted in the direction of arrow C by drive mechanism 25 until it is in an unlocking position (not shown in FIG. 1). In this unlocked position, the locking pin is no longer positioned beneath rim 7 of closure flap 5, but instead is retracted to the height of wall 10 of tank filling pipe 2. Closure flap 5 can then be pressed in the direction of arrow B.

Drive mechanism 25 of valve lock 20 can be operated by a button on the dashboard of the vehicle, for example. However, it can also be operated by remote control, for example, in particular the central locking system of the vehicle. In addition, a proximity switch (not shown in FIG. 1) may be provided in or on closure flap 5 to react to the approaching filling nozzle and automatically trigger operation of drive mechanism 25 as soon as the filling nozzle is closer than a certain minimum distance from surface 5' of closure flap 5. Once closure flap 5 is unlocked, it can be pressed inward along arrow B by the tip of the filling nozzle, for example. The filling nozzle can be inserted into tank filling pipe 2 and the tank filled. When the tank filling operation is completed, the filling nozzle is pulled back out of tank filling pipe 2. Driven by the restoring force of restoring spring 12, closure flap 5 moves in the direction of arrow A, so that tank filling pipe 2 is closed airtight again. Then locking pin 21 is again brought into the locking position shown in FIG. 1.

To prevent the filling nozzle from having to touch and press on closure flap 5, valve lock 20 may be designed so that the closure flap comes open when drive mechanism 25 is operated, e.g., by a spring/lever mechanism and closes again when it is operated again.

Locking pin 21 can be brought back into the locking position illustrated in FIG. 1 in various ways. For example, drive mechanism 25 can be operated again by the user as described above to move locking pin 21 into the locking position against arrow C in FIG. 1. If drive mechanism 25 is designed as a lifting magnet, locking pin 21 is automatically held in the locking position by spring 23 as long as it is not unlocked. After tank filling is completed, the closure flap moves in the direction of arrow B as described above, sliding over bottom sliding surface 22b of locking pin 21. The pin is then pushed away again briefly, so that closure flap 5 can close completely. After closure flap 5 has passed locking pin 21, the latter moves in the direction opposite that of arrow C, pressing closure flap 5, via sliding surface 22a, and closing it completely.

Figure 2:
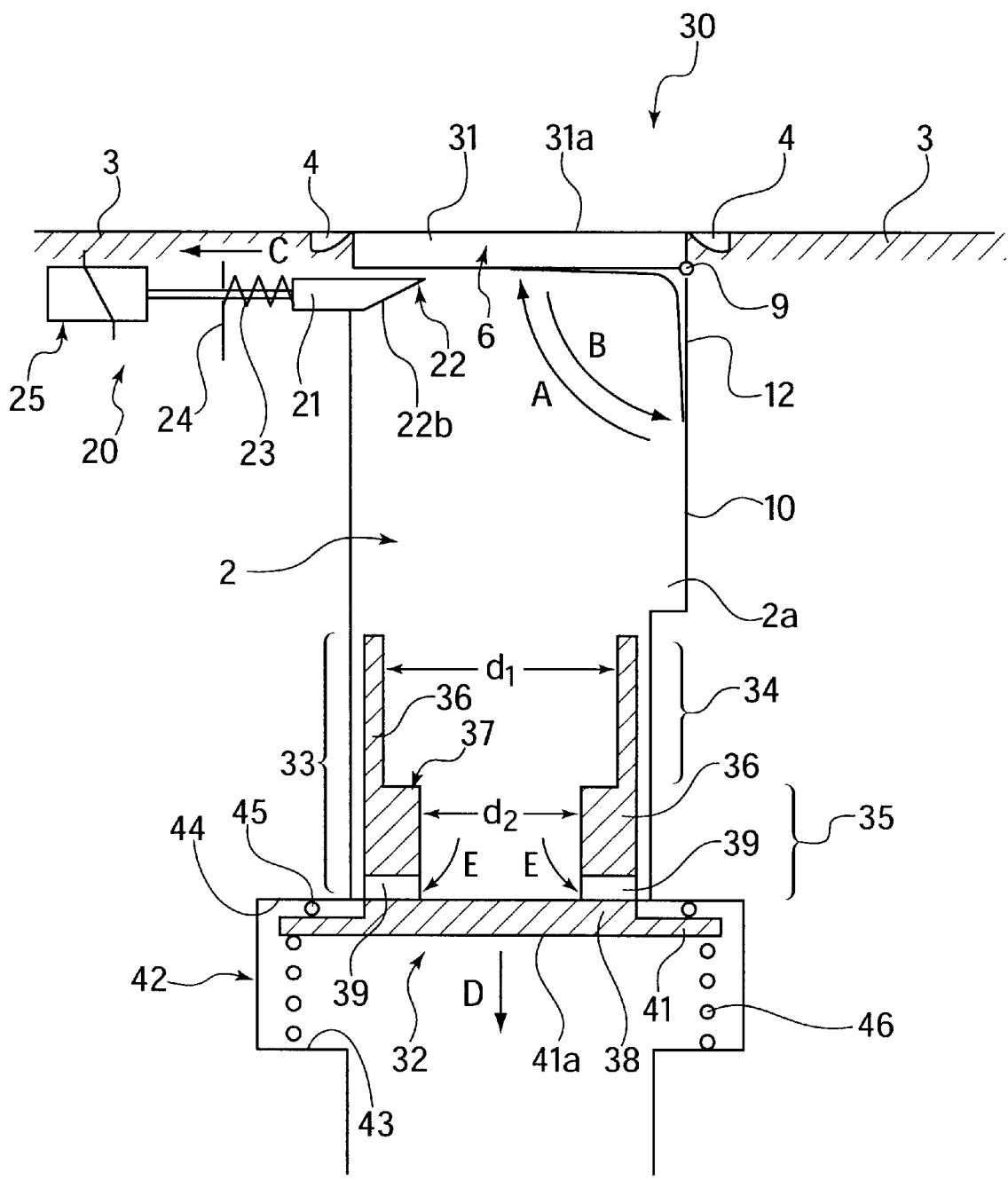
FIG. 2 shows a schematic diagram of a longitudinal section of a second embodiment of a tank closure according to the present invention.

A second embodiment of a closure 30 according to the present invention is shown in FIG. 2. Parts that remain the same in comparison with FIG. 1 are labeled with the same reference numbers. A closure flap 31 is also provided in this embodiment, but it has only an essentially rectangular area 6 and is not provided with a recess on its surface 31a. Closure flap 31 here is connected by hinge 9 to wall 10 of tank filling pipe 2 at lower edge 6'. The flap is held in the closed position illustrated in FIG. 2 by restoring spring 12 as described above. Tank filling pipe 2 also has a recess 2a for closure flap 31. Recess 2a accommodates closure flap 31 as soon as it has been opened in the direction of arrow B.

Closure flap 31 is not provided with a gasket. The airtight closure of tank filling pipe 2 is accomplished here by a closure valve 32 arranged in tank filling pipe 2 beneath recess 2a. Closure valve 32 includes essentially a hollow cylindrical part 33 sealed on one side by a bottom 38. Cylindrical part 33 has an upper area 34 and a lower area 35 adjacent to bottom 38. Inside diameter $d_1$ of upper area 34 is larger than inside diameter $d_2$ of lower area 35. Thus, a shoulder 37 is formed in inside wall 36 of cylindrical part 33. The diameter of upper area 34 is of a size such that the fuel carrying pipe of the filling nozzle fits into it. In lower area 35, filling openings 39 are provided in wall 36 of cylindrical part 33.

The diameter of bottom 38 of closure valve 32 is larger than the outside diameter of cylindrical part 33. This results in a peripheral rim 41 at the lower end of cylindrical part 33. Peripheral rim 41 projects into a widened area 42 of tank filling pipe 2. The widened area is delimited by two shoulders 43, 44 formed by wall 10 of tank filling pipe 2. A gasket 45 arranged between rim 41 and upper shoulder 43 guarantees an airtight closure of tank filling pipe 2. On lower side 41a of rim 41 there is arranged a valve closing spring 46 which is supported on lower shoulder 44. Valve closing spring 46 presses rim 41 of closure valve 32 against upper shoulder 43. This seals filling openings 39 with respect to the tank, so that no fuel can enter the tank and no vapors or the like can escape from the tank to the outside through closure flap 31.

This embodiment functions as follows. Closure flap 31 is unlocked by a locking device 20 as described for the first embodiment shown in FIG. 1. The only difference in comparison with the locking device shown in FIG. 1 is that locking pin 21 has only one lower sliding face 22b on its free end 22. The filling nozzle is introduced into tank filling pipe 2 and the fuel carrying tube is inserted into upper area 34 of closure valve 32. Then closure valve 32 is pushed down into tank filling pipe 2 with the tip of the filling nozzle against the force of valve closing spring 46 in the direction of arrow D until filling openings 39 are opened. Then fuel can flow into the tank in the direction of arrow E. Subsequently the filling nozzle is retracted, so that rim 41 of closure valve 32 is pressed again against upper shoulder 43 by the restoring force of valve closing spring 46, thus providing an airtight closure of the tank filling pipe. Closure flap 31 also closes automatically due to the action of restoring spring 12 and is locked either manually or automatically as described above.

Figure 3:
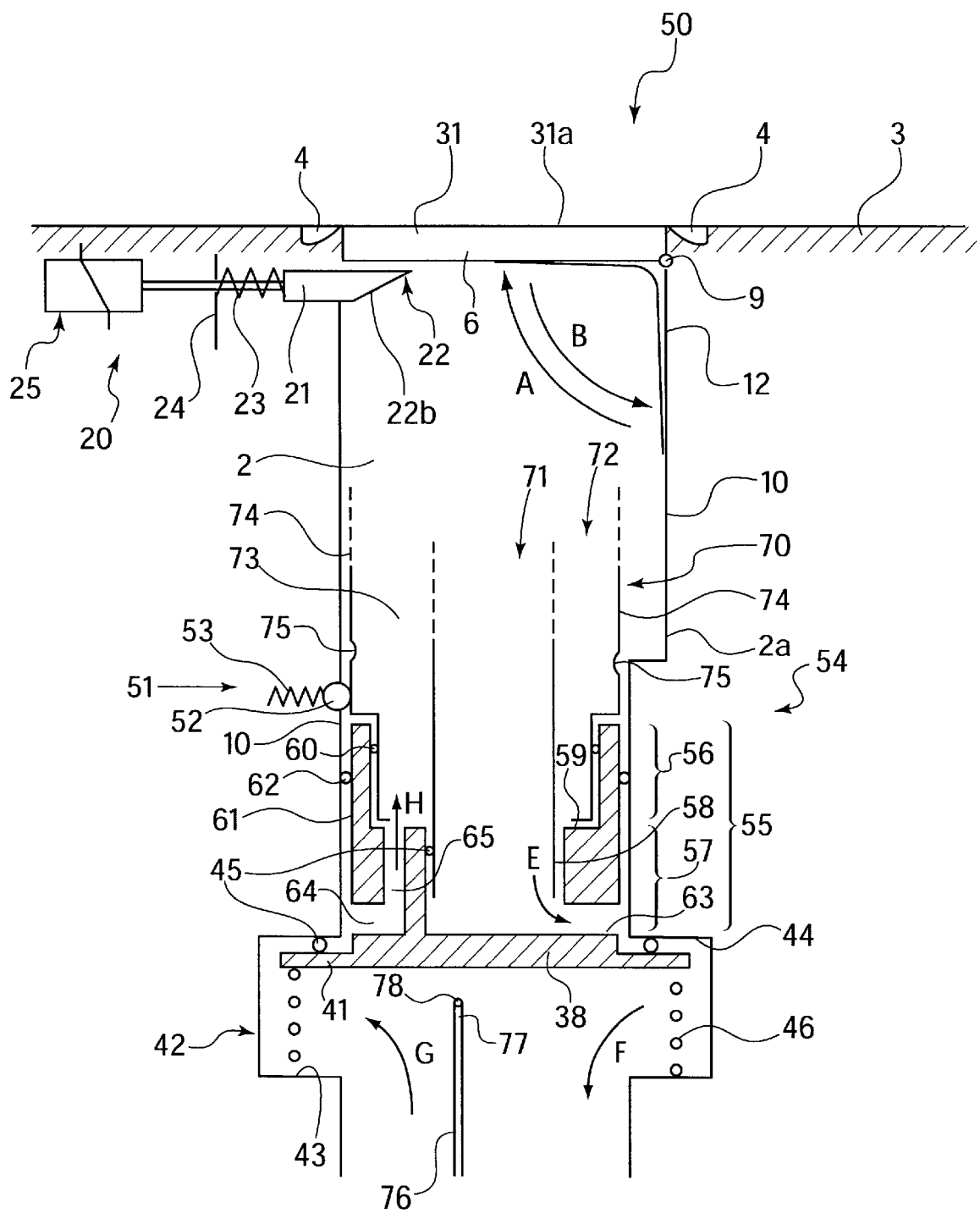
FIG. 3 shows a schematic diagram of a longitudinal section of a third embodiment of a tank closure according to the present invention.

Another embodiment of a closure 50 according to the present invention as shown in FIG. 3 is especially suitable for pressurized tank filling. In FIG. 3 parts that are identical to those in the embodiments shown in FIGS. 1 and 2 are labeled with the same reference numbers.

For pressurized tank filling, a special filling nozzle 70 as shown with dotted lines in FIG. 3 is needed, its fuel carrying tube 71 being provided with a jacket 72. Jacket 72 has an exhaust tube 73 for venting air and fuel vapors displaced out of the tank by the filling operation. Furthermore, a peripheral locking groove 75 is provided on outside wall 74 of jacket 72. This locking groove 75 corresponds to locking device 51 provided in tank filling pipe 2 in the form of a locking ball 52 loaded with a spring 53.

Closure 50 also has a closure valve 54 that essentially has a hollow cylindrical part 55 sealed by a bottom 38 on one side. Cylindrical part 55 also has an upper area 56 and a lower area 57 adjacent to bottom 38. The inside diameter of upper area 56 is larger than the inside diameter of lower area 57. This forms a shoulder 59 in inside wall 58 of cylindrical part 55. The diameter of lower area 57 is such that fuel carrying tube 71 of filling nozzle 70 fits into it. The rim of jacket 72 of filling nozzle 70 then sits on shoulder 59. In addition, a gasket 60 is provided on inside wall 58 in the upper area, sealing the gap between jacket 72 and inside wall 58. Another gasket 62 is provided between outside wall 61 of upper area 56 and wall 10 of tank filling pipe 2.

Again, the diameter of bottom 38 of closure valve 51 is larger than the outside diameter of cylindrical part 55. As in the case of the embodiment illustrated in FIG. 2, this results in a peripheral rim 41 that projects into a widened area 42 of tank filling pipe 2 and is sealed by a gasket 45 arranged between rim 41 and upper shoulder 43. Valve closing spring 46 presses rim 41 of closure valve 32 against upper shoulder 43 as described above.

In lower area 57 of cylindrical part 55, however, filling openings 63 for fuel are provided only on one side. Another opening 64 is connected to an air channel 65, arranged in the wall in the lower area of the cylindrical part and opening into exhaust tube 73 in jacket 72 of filling nozzle 70 when the nozzle is inserted into closure valve 51.

A partition 76 is provided beneath bottom 38 of closure valve 51 in tank filling pipe 2 and is provided with a gasket 78 on its upper end 77.

Closure 50 is operated as follows. Filling nozzle 70 is introduced as described into tank filling pipe 2 after closure flap 31 has been unlocked. Fuel carrying tube 72 is inserted into lower area 57 of closure valve 51. Then closure valve 51 is pressed down, as described, by the rim of jacket 72 sitting on shoulder 59, against the force of valve closing spring 46 until filling opening 63 is opened. Then spring-loaded locking ball 52 also engages in locking groove 75 in outside wall 74 of filling nozzle 70, securing it. At the same time, gaskets 60 and 62 ensure a seal so that a pressure can be built up. Furthermore, bottom 38 of closure valve 55 sits on partition 76, where gasket 78 ensures that the area to be filled has an airtight separation from the area of the tank to be vented. Then fuel can be forced into the tank under pressure in the direction of arrows E and F, while at the same time the air and fuel vapors displaced are vented through air channel 65 in the direction of arrows G and H.

The closure according to the present invention thus allows simple tank filling in a technically simple manner with a high degree of convenience and high operating reliability.

What is claimed is:

1. A closure for a tank, comprising:
   a closure flap for closing a tank filling pipe of the tank;
   a hinge connecting the closure flap to the tank filling pipe so that the closure flap can move into an inside of the tank filling pipe;
   a locking device for locking and unlocking the closure flap; and
   a control device for linking the ability to unlock the closure flap to operating conditions so that the closure flap cannot be unlocked while an engine is running.
2. The closure according to claim 1, wherein:
   the tank is a fuel tank for a motor vehicle.
3. The closure according to claim 1, wherein:
   the closure flap may be manually unlocked using the locking device; and
   the closure may be automatically locked after a tank filling operation is completed.
4. The closure according to claim 1, wherein:
   the locking device includes a locking pin arranged beneath the closure flap, the locking pin being movable by using one of an electrical drive mechanism and a mechanical drive mechanism.
5. The closure according to claim 1, wherein:
   the locking device is operable by remote control.
6. The closure according to claim 1, wherein:
   the locking device is arranged completely beneath the closure flap.
7. The closure according to claim 1, wherein:
   the tank filling pipe has a recess to accommodate the closure flap when the closure flap is pushed inward.
8. The closure according to claim 1, wherein:
   the closure flap may be pushed inward by inserting a filling nozzle.
9. The closure according to claim 8, wherein:
   the closure flap has a recess for the filling nozzle.
10. The closure according to claim 7, wherein:
    the closure flap includes an operating element, the operating element activating an opening mechanism for the closure flap via a controller.
11. The closure according to claim 10, further comprising:
    an operating mechanism operable by a remote control.
12. The closure according to claim 11, wherein:
    the remote control is for a central locking system of a motor vehicle.
13. The closure according to claim 10, wherein:
    the closure flap includes one of a spring mechanism and a lever mechanism as the opening mechanism and a closing mechanism.
14. The closure according to claim 1, wherein:
    the closure flap closes the tank filling pipe in an airtight manner.
15. The closure according to claim 14, further comprising:
    at least one gasket arranged between the closure flap and the tank filling pipe to provide an airtight seal.
16. The closure according to claim 1, further comprising:
    a closure valve providing an airtight seal.
17. The closure according to claim 16, further comprising:
    a valve seat arranged in the tank filling pipe;
    at least one gasket arranged between the valve seat and the closure valve, the valve closure being arranged on the valve seat.
18. The closure according to claim 17, further comprising:
    a valve closing spring that presses the closure valve against the valve seat.
19. The closure according to claim 16, wherein:
    the closure valve has at least one filling opening through which the tank may be filled.
20. The closure according to claim 16, wherein:
    the closure valve has a receptacle for a filling nozzle.
21. The closure according to claim 20, wherein:
    the receptacle includes at least one gasket providing a seal between the filling nozzle and the closure flap.
22. The closure according to claim 1, wherein:
    the locking device is adapted to engage in a locking groove in a filling nozzle.
23. The closure according to claim 1, further comprising:
    a closure valve within the tank filling pipe wherein the closure valve includes a separate filling opening and a separate vent opening.
24. The closure according to claim 23, wherein:
    the separate vent opening opens into a vent channel, the vent channel being provided in a filling nozzle.
25. A closure for a tank, comprising:
    a closure flap for closing a tank filling pipe of the tank wherein the tank filling pipe has a recess to accommodate the closure flap when the closure flap is pushed inward;
    a hinge connecting the closure flap to the tank filling pipe so that the closure flap can move into an inside of the tank filling pipe;
    a locking device for locking and unlocking the closure flap;
    a control device for linking the ability to unlock the closure flap to operating conditions so that the closure flap cannot be unlocked while an engine is running, wherein the closure flap includes an operating element, the operating element activating an opening mechanism for the closure flap via a controller; and
    a proximity switch, the proximity switch being an operating mechanism and detecting the presence of a filling nozzle.

\* \* \* \* \*